United States Patent Office 3,702,241
Patented Nov. 7, 1972

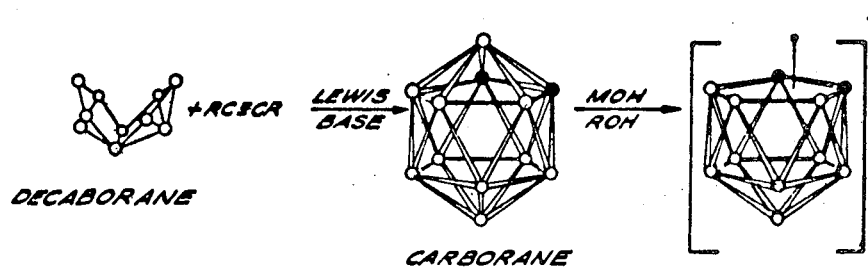

3,702,241
PESTICIDE COMPOSITIONS CONTAINING
DICARBADODECAHYDROUNDECABORATES
Donald C. Young, Fullerton, Calif., assignor to Union
Oil Company of California, Los Angeles, Calif.
Filed Apr. 11, 1968, Ser. No. 720,730
The portion of the term of the patent subsequent to
Nov. 10, 1987, has been disclaimed
Int. Cl. A01n 9/00
U.S. Cl. 71—79     10 Claims

ABSTRACT OF THE DISCLOSURE

Pesticidal compositions containing an inert pesticidal carrier and an effective amount of an active toxicant comprising dicarbadodecahydroundecaboric acid or its alkali metal or ammonium salts, wherein the active ingredient is the dicarbadodecahydroundecaborate anion having the following empirical formula:

$$[(BX)_m(BR_1)_nCR_2CR_3]^{-1}$$

wherein:

X is halogen or hydrogen;
$R_1$ has from 1 to 10 carbon and is alkyl, aryl, alkenyl or halo or carboxy derivatives thereof;
$R_2$ and $R_3$ are halogen, hydrogen or alkyl, aryl, alkenyl, carboxyl or cycloalkyl having from 1 to about 10 carbons;
$n$ is 0, 1 or 2; and
$m+n=9$.

The pesticides are active for a variety of biocidal purposes, e.g., as post- and pre-emergence herbicides, as fungicides, as insecticides and as bactericides.

DESCRIPTION OF THE INVENTION

The invention relates to pesticidal compositions and in particular relates to pesticidal compositions having a wide variety of biological activity.

The invention comprises compositions which contain as the biologically active component dicarbadodecahydroundecaborate anions. The dicarbadodecahydroundecaborate anion $(B_9H_9C_2H_2)^{-1}$, has the shape of an icosahedron with one missing apex which is formed by the carbon and boron atoms. The boron and carbon atoms lie in the vertices of the truncated icosahedron and a hydrogen atom is associated with the open face of the icosahedron.

The dicarbadodecahydroundecaborate anions are readily obtained from the icosahedron carborane structure by treatment of this carborane with an alkali metal hydroxide to abstract a boron atom therefrom. The carborane is in turn derived from decaborane by suitable treatment.

The preparation of the dicarbadodecahydroundecaborate anions is illustrated in the figure. In this diagram the boron atoms are unshaded and the carbon atoms are shaded. The small shaded spheres represent significant hydrogen atoms while the terminal substituents $x$, $R_1$ or $R_2$, one of which is attached to each boron or carbon atom, have been omitted from the drawing. The dicarbadodecahydroundecaboric acid and its salts is prepared from decaborane or alkyl substituted decaborane by reaction with acetylene to produce the carborane which is then degraded with alcoholic base to abstract a boron atom and thereby form the dicarbadodecahydroundecaborate anion.

In the preparation of dicarborane, decaborane is purified by sublimation or recrystallization and dissolved in an organic solvent such as an ether. A Lewis base such as diethyl sulfide, acetonitrile, etc., is added to this solution and the solution is maintained at about 25°–85° C. for an extended period while acetylene is passed into contact with the solution. The reaction is as follows:

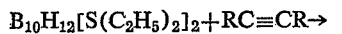
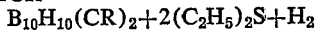

The reaction mixture is evaporated under vacuum to remove the Lewis base, e.g., diethyl sulfide, and the solvent. The product is dissolved in an inert solvent and reacted with concentrated hydrochloric acid to convert byproducts to hydrogen and borates. The crude dicarborane is recovered from the solvent by cooling and separating it as a solid. The solid product is washed with aqueous potassium hydroxide, filtered and dried. The dried solid is then extracted with a hydrocarbon solvent and purified dicarborane is crystallized as a solid from the hydrocarbon.

The product from the acetylene addition is 1,2-dicarbaclovododecaborane. Heating of this product neat or in an inert solvent to a temperature of about 500° C. will isomerize the 1,2 - dicarborane to the 1,7-dicarborane isomer in substantially total yield. Heating of the 1,7-isomer to about 600° C. will cause further rearrangement to the 1,12-dicarborane. The carbollides of all these positional isomers possess pesticidal activity.

The dicarborane can be obtained with various substituents on the carbon atoms by the use of appropriately substituted acetylene. Thus bromomethyl dicarborane can be obtained by the use of propargyl bromide rather than acetylene in the aforedescribed preparation. Use of phenyl acetylene likewise provides phenyl dicarborane. In general, any substituted acetylene can be used in the preparation of the dicarboranes and thereby obtain a dicarborane having the same substituent on its carbon atom or atoms. Examples of suitable acetylenic reactants include amyl acetylene, amylmethyl acetylene, butyl acetylene, butylethyl acetylene, butylmethyl acetylene, chloro acetylene, decylmethyl acetylene, di-n-amyl acetylene, dibromo acetylene, dibutyl acetylene, diiodo acetylene, diethyl acetylene, dimethyl acetylene, diphenyl acetylene, dipropyl acetylene, divinyl acetylene, ethyl acetylene, ethylpropyl acetylene, n-heptyl acetylene, isopropyl acetylene, methylphenyl acetylene, n-propyl acetylene, vinyl acetylene, etc. These carbon substituted dicarboranes can be thermally isomerized to the 1,7- and 1,12-dicarboranes in the same fashion described in regard to the substituted dicarborane.

The dicarbadodecahydroundecaborate ion can be prepared from the 1,2- or the 1,7-dicarborane which can have hydrogen or any of the aforementioned substituents on the cage carbon atoms. The monovalent dicarbadodecahydroundecaborate anion is obtained by degradation of dicarborane with alcoholic base, e.g., alcoholic solution of potassium hydroxide, sodium hydroxide or piperidine. This is illustrated in the figure as the second step in the method. In this preparation, the dicarborane is dissolved in a suitable alcohol, e.g., methanol, ethanol, isopropanol, butanol, etc., which contains a strong alkali such as an alkali metal hydroxide or piperidine. The reaction is performed at ambient to reflux temperatures at atmospheric or superatmospheric pressure. The strong base abstracts a boron atom from the carborane which forms a borate ester with the alcohol and evolves hydrogen from the reaction mixture, as follows with potassium hydroxide in methanol:

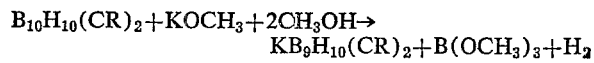

$B_{10}H_{10}(CR)_2 + KOCH_3 + 2CH_3OH \rightarrow$
$KB_9H_{10}(CR)_2 + B(OCH_3)_3 + H_2$ After hydrogen ceases to be evolved, the reaction mixture is cooled and the alkali metal dicarbadodecahydroundecaborate can be purified by precipitation of the excess alkali as the carbonate by saturating the solution with carbon dioxide, filtration, and evaporating the filtrate to dryness to recover the alkali dicarbadodecahydroundecaborate. The resultant salt can be converted to the salt of other cations by base exchange reactions to thereby obtain the ammonium salts or organic ammonium salts or can be acidified with the addition of a mineral acid or by ion exchange over a hydrogen charged cation exchange resin to prepare dicarbadodecahydroundecaboric acid.

The dicarbadodecahydroundecaborate ions can also be obtained with various substituents bonded to the boron and carbon atoms of the carbollyl cage. These derivatives are attached to the cage atoms by two center bonds. For the simplest case the groups on the cage atoms are terminally bonded hydrogen. The carbon atoms, however, can be substituted with a plurality of groups such as alkyl, e.g., methyl, propyl, isopropyl, ethyl, butyl, amyl dodecyl, hexadecyl, etc.; aryl and alkaryl, e.g., phenyl, tolyl, xylyl, naphthyl, cumenyl ethylphenyl, etc.; alkenyl, e.g., propenyl, amyl, butenyl, etc.; halo, e.g., iodo, bromo, chloro, fluoro, carboxyl e.g., carboxymethyl, carboxyethyl, carboxypropenyl, etc.

The aforementioned substituents can be formed on one or both of the carbons of the dicarborane used as the dicarbadodecahydroundecaborate precursors by use of the appropriately substituted acetylene in the synthesis of the dicarborane from decaborane as previously mentioned. The use of some substituted acetylenes and the identification of the resulant 1 and 1,2-substituted carboranes appears in Inorganic Chemistry, vol. 2, No. 6, 1115–1119. The syntheses comprise reaction of the substituted acetylene with decaborane in an inert solvent and in the presence of a Lewis base such as acetonitrile or diethyl sulfide. Using the appropriately substituted acetylene, the syntheses of the following carboranes are reported: 1-ethyl carborane, 1-propylcarborane, 1-hexylcarborane, vinylcarborane 1-phenylcarborane, 1-beta-bromoethylcarborane, 1-chloromethylcarborane, 1-betachloroethylcarborane, 1,Ω-chloropropylcarborane, 1-carboranylmethyl acetate, 1-carboranylmethyl acrylate, 1-carboranylglycol diacetate, 1-carboranylethylidene dipropionate, 1-methyl-2-carboranylethylidene dipropionate, 1,2-bis(alpha-methylvinyl) carborane, 1,2-bis(chloromethyl)carborane 1,2-bis(carbomethoxy)carborane, 1 - methyl-2-bromomethyl-carborane, 1,2 - diisopropylcarborane, 1,2 - bis-(hydroxymethyl)carborane, 1-hydroxymethyl-2-(γ-hydroxy-α-propyl)-carborane, diethyl - 2,2-bis-(1 - carboranylmethyl)-malonate and 1-bromomethyl-2-methylcarborane.

Carbon substituted derivatives

The hydrogen bonded to the carbon of the decarborane or of the dicarbadodecahydroundecaborate anion exhibits the similar reactivity as the hydrogen on acetylene and accordingly a cage carbon atom can also be substituted by any of the reactions employed for substitution on acetylene. Thus, the carborane or dicarbadodecahydroundecaborate can be alkylated by reaction with an alkyl halide in the presence of a Lewis acid such as aluminum or ferric bromide or chloride; see U.S. Pat. 2,999,117; to substitute the cage carbon atoms with an alkyl or aryl group.

The cage carbons can also be substituted with a variety of groups by the Grignard reaction. In this reaction, the 1- or 1,2-halo substituted carborane or carbollide is reacted in an inert solvent, e.g., ethyl ether, with magnesium to form a Grignard reagent which readily undergoes standard Grignard reactions to substitute the cage carbons. This reaction is described in the aforecited publication and in Inorganic Chemistry, vol. 2, No. 6, pages 1115–1125 (December 1963). The carboranyl Grignard reagent, e.g., 1-carboranylmethylmagnesium bromide can be reacted with: (1) alkyl or alkenyl ketones or aldehydes to prepare secondary and tertiary carboranyl alcohols, (2) formaldehyde to prepare a primary carboranyl alcohol, or (3) alkyl, aryl or alkenyl halides to prepare alkyl, aryl or alkenyl halides to substituted carboranes, (4) acetals to prepare alkyl carboranyl ethers, or (5) nitriles to prepare carbonyl ketones.

Examples of reactants which can be used are: formaldehyde, acetaldehyde, propionaldehyde, butyraldehyde, isobutyraldehyde, methylethyl ketone, diisopropyl ketone, benzaldehyde, crotonaldehyde, acrolein, etc.; ethyl chloride, methyl bromide, allyl bromide, chlorobenzene, amyl fluoride, chloronaphthalene, etc.; 1,1-dimethoxy ethane, 1,1-diisopropoxy butane, 1,1-diethoxy hexane, etc.; acetonitrile, acrylonitrile, benzonitrile, crotonitrile, valeronitrile, methacrylonitrile, butyronitrile, isobutyronitrile, capronitrile, etc. The choice of solvent can also influence the product obtained from the Grignard reaction, e.g., it has been reported that when allyl bromide was reacted with the Grignard reagent, 1-carboranylmethylmagnesium bromide, the normal reaction yields 4-(1-carboranyl)-1-butene; however, with tetrahydrofuran as the solvent, 1-allyl-2-methylcarborane is obtained.

The carborane intermediate can also be reacted with alkyl and aryllithium reagents, e.g., butyl or phenyl lithium, at temperatures from 0° to 30° C. to provide the 1-lithium and 1,2-dilithium carboranes which can then be reacted to produce carboranyl acids, carbinols and halides. To illustrate, the contacting of dilithium dicarborane with carbon dioxide at temperatures from 0° to 25° C. forms the lithium salt of 1,2-carboranedicarboxylic acid from which the acid can be formed by acidification. Contacting the lithium carborane with an alkylene oxide, e.g., ethylene oxide, yields the hydroxyalkyl derivatives, e.g., 1,2-bis-(hydroxyethyl)-carborane. The carboranediformyl halides can be obtained by reaction of the lithium salt of 1,2-carboranedicarboxylic acid with excess oxalyl chloride. The resultant acid chloride can then be reacted with alkyl, cycloalkyl and alkenyl alcohols to form esters of the 1,2-carboranedicarboxylic acid. The disubstituted carboranes have also been found to exhibit a strong tendency to form 1,2-exocyclic derivatives. Treatment of the bis(hydroxy)-carboranes with an acid such as concentrated sulfuric at temperatures from 100° to 175° C. forms cyclic ethers. Upon heating to about 250°–300° C. the bis(2-carboxy-1-carboranylmethyl)ether form 2 moles of a carboranyl lactone, $B_{10}H_{10}CCH_2OC(O)C$; and the 1,2-dicarboranedicarboxylic acid forms a cyclic anhydride by contacting with dehydrating agents such as thionyl chloride in the presence of sodium carbonate.

Boron substituted derivatives

The hydrogen bonded to the boron of the icosahedral cage is also bonded with a two-center bond and these hydrogen atoms can be replaced wih various substituents. Simple halogenation of the carborane or dicarbadodecahydroundecaborate anion will first halogenate the boron atoms to provide anions containing up to 10 bromo, fluoro, chloro or iodo atoms. A description of the halogenation as applied to chlorination of dicarborane appears in Inorganic Chemistry, vol. 2, No. 6, pages 1092–1096 (December 1963). This reaction comprises contacting the carborane or the biologically active anion in an inert solvent with gaseous halogen, e.g., chlorine. The boron atoms are halogenated first before halogenation of the carbon atoms or atoms. The degree of halogenation can be controlled by limiting halogen concentration or the solvent, e.g., carbon tetrachloride, to precipitate the halogenated carboranes as the di, tri, tetra, hexa, octa, deca and undeca-halocarborane.

The dicarbadodecahydroundecaborate anion can also be obtained having one or two of the cage boron atoms in the upper plane, i.e., atoms 4, 8 and 7 of the icosahedron substituted with an alkyl, aryl, alkaryl, aralkyl, alkenyl, aralkenyl, etc. group. A procedure that can be used to prepare the boron substituted derivatives comprises reforming the carborane from the dicarbadodecahydroundecaborate anion using an organic boron halide. The resultant boron substituted carborane can then be treated with strong base or alkali metal halide to abstract a boron atom from the cage and form the boron substituted dicarbadodecahydroundecaborate anion. This procedure can be repeated to prepare a disubstituted dicarbadodecahydroundecaborate anion having two of the open face borons substituted with an organic group. This procedure is illustrated in the examples and briefly comprises reaction of the acid or a soluble salt of the acid, e.g., an alkali metal dicarbadodecahydroundecaborate with an organic substituted boron halide. This reaction is performed at ambient conditions of temperature and pressure and proceeds as follows:

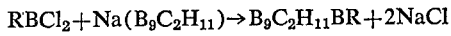

$$RBCl_2 + Na(B_9C_2H_{11}) \rightarrow B_9C_2H_{11}BR + 2NaCl$$

wherein R contains from 1 to about 10 carbons and is alkyl, alkenyl, aryl and halo, carboxy or sulfo derivatives thereof.

Examples of suitable R groups are methyl, carboxymethyl, chloromethyl, ethyl, isopropyl, amyl, dodecyl, octadecyl, phenyl, p-bromophenyl, 2-lauryl-4-sulfophenyl, xylyl, tolyl, naphthyl, dichlorophenyl, vinyl, allyl, butenyl, etc.

The resultant boron substituted carborane can then be reacted in the manner previously described to abstract a boron hydride from the icosahedron structure and thereby form a B-substituted dicarbadodecahydroundecaborate ion with the organic substituent on a boron atom in the open face of the truncated icosahedron. Repeated insertion of a like or differently substituted boron atom provides a route to B,B'-disubstituted dicarbadodecahydroundecaborate ions.

The pesticidal compositions of the invention can be prepared by combining one or a mixture of the aforedescribed dicarbadodecahydroundecaborate salts with an inert liquid or solid pesticidal carrier material in the conventional manner. Thus, one or a mixture of such dicarbadecahydroundecaborate salts may be dispersed or dissolved in water with the aid of a dispersing agent, when necessary, to form a concentrate composition which can subsequently be diluted with water to form a spray suitable for application to living plants, lumber and other materials subject to attack by pests. Alternatively, the product may be admixed with an inert solid carrier material such as talc, starch, diatomaceous earth, aluminum silicates, etc., to form dusting compositions which can be employed as such or dispersed in an aqueous or oleaginous vehicle to form a spray.

Various surface active agents can be incorporated in the pesticidal compositions in accordance with the practice of the art in formulating such compositions. The surface agents can be used in amounts from 0.01 to 10 weight percent of the compositions or from 0.5 to about 35 weight percent of toxicant concentrates used to prepare the pesticidal compositions by admixture with a carrier material to form a spray or dusting powder. The surface active agent can be anionic, cationic or non-ionic. The anionic surface active agents can be obtained by sulfonation of fatty derivatives such as sulfonated tallow, vegetable or marine animal oils. Commercially available surface active agents of this class are: Tallosan RC, Gamafon K, Finish WFS, etc. Other surfactants include sulfonated fatty acid ester of mono and polyvalent alcohols, e.g., Nopco 2272R, Mekal N3, or sulfated and sulfonated fatty alcohols such as Duponal ME, Duponal LS, etc. The nonionic surface active agents include ethylene oxide condensates with fatty acids, e.g., Nonisol 100; with fatty alcohols, e.g., Brij 30; with alkylphenols, e.g., Igepal W; with fatty amides, e.g., Ethoamides; with fatty oil partial esters of hexitans, e.g., Spans, Tweens, etc. The cationic surface active agents that can be used include ammonium salts of quaternized alkylamines and alkylenediamines, e.g., Ethyl Cetab, Arqued 18; alkylarylammonium halides, e.g., Zephirol; mixed ammonium salts of fatty amines derived from vegetable oils and marine animal oils, e.g., Roccal; etc. In general, any of the conventional formulation techniques may be followed in employing the present dicarbadodecahydroundecaborate anions as active components in pest control compositions and any of the wetting agents, spreaders, sticking agents, diluents, carriers, etc., which are conventionally employed in formulating pest control compositions may be used in combination with the present dicarbadodecahydroundecarborate biologically active anions.

The dicarbadodecahydroundecarborate containing compositions are effective in controlling a variety of pest organisms in relatively small quantities and in the interest of economy they can be formulated in concentrations of the order of 50–50,000 parts per million. The pesticide compositions themselves are of course employed in amounts sufficient to secure the desired degree of control which amounts depend to some extent upon the particular dicarbadodecahydroundecarborate which is employed as the active ingredient as well as upon the particular pest organism involved and the method by which the composition is applied. A preferred embodiment of the invention lies in the use of aqueous solutions of the water soluble acid, alkali metal and ammonium salts of the unsubstituted dicarbadodecahydroundecaborate anion, e.g., potassium or hydrogen dicarbadodecahydroundecaborate, which is applied to the soil or to the plants to provide an amount comprising about 100 to 1000 parts of the active ingredient per million parts of the soil.

The dicarbadodecahydroundecaborate containing pesticides are usually marketed in concentrate form, with dilution to the ultimate concentration being effected by the consumer at the point of use. Liquid concentrate compositions usually contain between about 1 and about 15 percent by weight of the active ingredient and sufficient of an emulsifying or dispersing agent to maintain the active ingredient uniformly dispersed in an inert liquid suspending medium. Solid concentrates usually contain between about 5 and about 50 percent by weight of the active ingredient and, optionally, small amounts of spreading agents and other conventional adjuvants.

The following examples will illustrate the preparation of the active hydrodicarbollide compositions and illustrate the preparation of typical pest control compositions containing various members of the dicarbadodecahydroundecaborate family of active ingredients.

EXAMPLE 1

Preparation of carborane

This example illustrates the preparation of 1,2-dicarbaclovododecaborane(12) from decarborane and acetylene. The preparation is performed in a one-liter, round-bottom, three-necked flask which is fitted with an automatic temperature control device in one of the necks, a spark-free stirring motor with a stirring rod extending through the center neck, and a water-cooled condenser attached to the remaining neck. The condenser connection has a concentric tube used for introduction of acetylene and this tube is extended to beneath the liquid level of the reactants in the round bottom flask. The water-cooled condenser is placed upright for total reflux and the upper end of the condenser is fitted with a U-shaped, Dry Ice cooled condenser and the gases from the Dry Ice condenser are passed into an empty 125 milliliter Erlenmeyer flask and then below the liquid level of a similar flask partially filled with oil.

The gas introduction train consists of a nitrogen cylinder and an acetylene cylinder which are manifolded into a purification train comprising a first 1000 milliliter Erlenmeyer flask and then three 500 milliliter round-bottom flasks connected in series having gas introduction tubes at the bottom of the flask fitted with extra coarse gas dispersion tubes and filled from ⅓ to ½ with concentrated sulfuric acid. The gas exit from the last purification flask is passed to an empty 1000 milliliter Erlenmeyer vessel and then to the base of a column three feet in height that is packed with a mixture of potassium hydroxide and a drying agent such as anhydrous calcium sulfate. The top of the column is connected to another empty 1000 milliliter Erlenmeyer flask and the gases are removed from this Erlenmeyer flask and passed to the tube extending through the neck of the 1000 milliliter reaction vessel. The empty Erlenmeyer flasks are employed to serve as traps for liquids which may inadvertently nitrogen so that nitrogen can be used to purge and sweep the flask contents. Over a two-hour period a solution of 150 milliliters of acetone, 400 milliliters methanol and 150 milliliters concentrated hydrochloric acid are introduced into the flask to convert the reactive byproducts to hydrogen and borates. The flask contents are stirred for an additional 12 hours until no more gas is evolved and the resultant solution is then placed in a one-liter addition funnel and added slowly to three gallons of water maintained at a temperature of 95°–100° C. Some decomposition of additional byproducts occurs; the hydrochloric acid and acetone are extracted into the water phase and the benzene is vaporized from the system. The aqueous mixture is stirred for an additional 10 minutes and the crude carborane which separates as a solid in the aqueous phase is removed and dissolved in 500 milliliters methanol in a two-liter Erlenmeyer flask.

The crude carborane is then purified by the addition of a solution of 50 grams potassium hydroxide in 75 milliliters of water and agitated for 3 minutes, then poured into 3 gallons of ice water, stirred for 10 minutes, and filtered. The filtered solid is dried in a vacuum over phosphorus pentoxide and the dried product is mixed with 30 grams anhydrous calcium chloride and placed in thimble of a Soxhlet extraction apparatus. The mixture is extracted with 500 milliliters of heptane for 20 hours. The carborane is recovered from the heptane by crystallization and filtration by placing the heptane in a rotary evaporator heated with a steam bath to evaporate the heptane to 50 milliliters. After separation of the carborane, the filtrate is cooled and a second crop of carborane is obtained. The combined yield after drying is about 85 grams and an additional 3 to 4 grams of impure material may be obtained by evaporating the hexane solution to dryness. In repeated runs this impure material can be added to the mixture in the Soxhlet thimble for further purification.

EXAMPLE 2

Preparation of bromomethylcarborane

The following illustrates the preparation of 1-bromomethyl - 1,2-dicarbaclovodecaborane(12). A three-necked flask and the apparatus described in the previous experiment is employed in the preparation of the bromomethylcarborane. The reaction flask is purged and filled with nitrogen, then charged with 49.9 grams decaborane, 32 milliliters acetonitrile, 35 milliliters propargyl bromide and 350 milliliters of benzene. The solution is stirred and heated at reflux temperature for two hours and thereafter the introduction of the propargyl bromide is initiated by introduction of 11 milliliters of the propargyl bromide through a nitrogen-filled addition funnel dropwise over a one-hour period. The addition funnel is then removed, the flask stoppered and the solution is maintained at reflux temperature for 1½ hours and then the flask is unstoppered, the addition funnel is replaced, and an additional quantity of 11 milliliters propargyl bromide is introduced. After 1½ hours of stirring of the flask contents at reflux temperature, the remainder of the propargyl bromide is introduced and the flask contents are again stirred for 1½ hours at reflux temperature.

The solution is then cooled to room temperature and washed with benzene into a single necked flask. The solvent is removed from the flask using a water aspirator vacuum and gentle heating from a steam bath. The residue in the flask is then cooled to room temperature, removed from the vacuum and 200 milliliters of hexane is added and stirred with the residue to extract most of the carborane. The hexane extract is decanted and the brownish tar is again extracted with 40 milliliters of hexane. The second extraction converts the tar residue to a solid which is removed by filtration and washed on the filter with an additional 40 milliliters of hexane. The combined hexane extracts are filtered and washed in a separatory funnel with four 100 milliliter portions of chilled aqueous 10 weight percent sodium hydroxide solution and then with four 100 milliliter portions of water. The hexane solution, yellow in color, is dried over anhydrous magnesium sulfate and filtered and the solvent is then evaporated in a rotary evaporator using a water aspirator.

The carborane remaining in the evaporator flask is washed with a small amount of pentane into a single necked 300 milliliter flask which is attached to an alembic column. Glass wool is placed in the solution, in the neck of the alembic distillation column, and at the top of the column to inhibit bumping during the distillation. The distillation flask, collecting flask and column are continuously evacuated with a high vacuum system. When the bulk of the pentane and residual hexane have distilled away, the temperature of the water bath surrounding the distillation flask is raised from room temperature to 125° C. over a one-hour period. When the distillation rate slows appreciably, the flask contents are raised to 150° C. and maintained there until no more distillate is obtained. The distillation flask is then cooled to room temperature, the vacuum is reduced on the system, and the product is removed to recover 86.5 grams of distilled product. The bromomethylcarborane may be further purified by crystallization from pentane or methanol if desired.

EXAMPLE 3

Methylcarborane

The following describes the preparation of 1-methyl-1,2-dicarbaclovodecaborane(12). This material is prepared by hydrolysis of the Grignard reagent formed from the reaction of bromomethylcarborane; see the preceding preparations; with magnesium in the presence of diethylether. The preparation is carried out in a one-liter, 3-necked flask equipped with a mechanical stirrer, reflux condenser, pressure equalizer, closed addition funnel and nitrogen inlet. The flask is maintained filled with nitrogen throughout the course of the reaction. The flask is charged with 6.1 grams magnesium chips, 50 milliliters of anhydrous diethylether, warmed to 30° C., and then a solution of 50 grams of distilled bromomethylcarborane dissolved in 300 milliliters of anhydrous diethylether is introduced slowly into the flask while the flask contents are stirred. The flask is gently warmed to reflux temperature and then the heating mantle is removed and the addition of the carborane solution is maintained at a rate sufficient to maintain the reflux temperature. The bromoethylcarborane solution is added within about 35 minutes and the stirred reaction mixture is then maintained at reflux temperature by heating for 2½ hours.

The solution is then cooled to room temperature and is decanted from the excess magnesium into a 2-liter beaker half-filled with crushed ice. The carboranyl magnesium bromide is washed into the ice mixture with two 50 milliliter portions of diethylether. Hydrochloric acid of 3 normality in a sufficient quantity to dissolve the magnesium salts is added to the stirred ice mixture and the ether and water layers are separated. The water layer is extracted three times with 75 milliliter portions of diethylether. After the combined ether extracts are dried over anhydrous magnesium sulfate, the ether is removed in a rotary evaporator. The evaporator flask contents are then dissolved in 90 milliliters of hot methanol and the solution is permitted to cool slowly to 0° C. The methyl carborane crystallizes from the methanol and is filtered therefrom. A portion of the methanol liquor is removed, heated and water added to the solution until it becomes cloudy. The solution is then cooled to 0° C. to obtain an addition crop of methyl carborane crystals. The combined crops are dried in a vacuum to yield 31 grams of methyl carborane.

EXAMPLE 4

Dimethylcarborane 1,2-dimethyl-1,2-dicarbaclovodecaborane(12) is prepared by the hydrolysis of the Grignard reagent formed from the reaction of bromomethylcarborane with magnesium in the presence of tetrahydrofuran.

A one-liter, three-necked flask equipped with a mechanical stirrer, reflux condenser, addition funnel and nitrogen inlet is thoroughly dried and flushed with nitrogen. Into the flask is placed 6.1 grams of clean magnesium chips and about 15 milliliters of tetrahydrofuran. The closed addition funnel is charged with 50 grams of distilled bromomethylcarborane dissolved in 250 milliliters of tetrahydrofuran. About 50 milliliters of the solution is then rapidly added to the stirred magnesium suspension to cause initiation of the Grignard reaction. The rate of addition is controlled thereafter so that the heat of the reaction is sufficient to maintain reflux temperature. After addition is complete, the flask is maintained at reflux temperature for an additional 2.5 hours.

The cooled reaction solution is rapidly decanted under nitrogen from the excess magnesium into a second one-liter, three-necked flask equipped with a mechanical stirrer, addition funnel, Dry Ice condenser and nitrogen inlet. The addition funnel of this flask is charged with 48 grams of methyl iodide and the methyl iodide is then added dropwise to the solution in the flask at an addition rate to maintain a reflux temperature. Upon completion of the addition of methyl iodide, the solution is maintained at the reflux temperature for an additional 3 hours and then cooled. The cooled mixture is then slowly added to about 400 milliliters of chilled dilute 1 N hydrochloric acid. The product is extracted with 250 milliliters of diethylether and then with 375 milliliter portions of diethylether. The combined ether extracts from the aqueous phase are washed once with 75 milliliters of water and then dried over magnesium sulfate. The diethylether solvent is then evaporated under vacuum using a rotary evaporator and the flask contents are then dissolved in ethanol. The product is separated from the ethanol by crystallization by cooling the ethanol and additional crops of crystals are obtained from the mother liquor by concentrating the mother liquor and adding water to the solution until it becomes cloudy and then cooling the solution to 0° C. The total of 33 grams of product is crystallized from the ethanol liquor.

EXAMPLE 5

Phenylcarborane 1-phenyl-1,2-dicarbaclovododecaborane(12) is prepared from decaborane, acetonitrile and phenylacetylene following a procedure similar to that set forth in Experiment 2 for the preparation of bromomethylcarborane. The reaction flask is charged with 50 grams purified decaborane, 22 milliliters acetonitrile and 500 milliliters benzene. The solution is refluxed for two hours and thereafter the 42 grams of phenylacetylene is added dropwise and the mixture is then refluxed for 30 hours. The solvent is removed under vacuum in a rotary evaporator, the residue is extracted with 1 milliliter pentane and the pentane solution is washed 4 times with 100 milliliter portions of 10 weight percent sodium hydroxide solution. The pentane solution is then dried over anhydrous magnesium sulfate and the solvent is removed with a rotary evaporator at reduced pressures to give 61.5 grams of crystalline phenylcarborane.

EXAMPLE 6

Phenylcarborane isomerization 1-phenyl-1,7-dicarbaclovodecaborane(12) is prepared by thermal rearrangement of the phenylcarborane prepared in the preceding experiment. This thermal rearrangement is performed in a 100 milliliter stainless steel autoclave which is charged with 5 grams of the phenylcarborane of the preceding example. The autoclave is evacuated with a mechanical vacuum pump and then heated electrically to a temperature of 420° C. for 24 hours. After cooling, the contents of the autoclave are dissolved in 30 milliliters of pentane and analyzed by thin layer chromatography to obtain 3.4 grams of the 1-phenyl-1,7-dicarbaclovodecaborane and 1.5 grams of the unconverted 1-phenyl-1,2-carborane.

EXAMPLE 7

Dimethyl derivatives

The following experiments describe the preparation of the (3)-1,2-dicarbadodecahydroundecaborates:

The 1,2 - dimethyl-(3)-1,2-dicarbadodecahydroundecaborate(-1); $[B_9C_2H_{10}(CH_3)_2]^{-1}$ is prepared by the treatment of dimethylcarborane with alcoholic base to abstract a boron atom from the carborane. This reaction is performed in a 500 milliliter, three-necked flask equipped with a reflux condenser, a mechanical stirrer and a nitrogen inlet. To the flask is charged a solution of 20 grams potassium hydroxide in 300 milliliters of absolute ethyl alcohol. The solution is cooled to room temperature and then 30 grams of dimethylcarborane is added and the solution is stirred for one hour at room temperature and then heated to reflux temperature and maintained at that temperature until the evolution of hydrogen has ceased. The flask contents are then cooled and an additional 100 milliliters of absolute ethyl alcohol is added and carbon dioxide is then introduced into the solution to precipitate excess potassium hydroxide as the carbonate. The precipitate is removed by filtration and washed five times with 50 milliliter portions of absolute ethyl alcohol. The combined filtrate and washings are evaporated to dryness to yield a crude potassium salt which is water soluble and which can be base-exchanged with other cations such as trimethyl ammonium, cesium, etc., or can be obtained in the acid form by acidification of a salt solution with a mineral acid, e.g., hydrochloric or sulfuric acid. Alternatively, an aqueous solution of the salt form can be passed over a hydrogen charged cation exchange resin such as hydrogen charged Amberlite IR-120.

EXAMPLE 8

Other dicarbadodecahydroundecaborate derivates

The (3)-1,2-dicarbadodecahydroundecaborate(-1) ion, the 1 - phenyl-(3)-1,2-dicarbadodecahydroundecaborate-(-1) ion, and the (3)-1,7-dicarbadodecahydroundecaborate(-1) ion are prepared in the same manner with the exception that the 1,7-isomer is formed under higher temperature conditions than the corresponding 1,2-isomers. This is accomplished by carrying out the initial alcoholic potassium hydroxide degradation in a stirred autoclave under pressure at about 150° C.

EXAMPLE 9

The following example will illustrate various pesticide compositions containing the biologically active hydrodicarbollide components which are present in a dusting composition using a solid carrier.

| Components | Compositions (weight percent) | | | | | | | |
|---|---|---|---|---|---|---|---|---|
| | 1 | 2 | 3 | 4 | 5 | 6 | 7 | 8 |
| Active component: | | | | | | | | |
| Tetramethylammonium dicarbadodecahydroundecaborate | 0.3 | | | | 0.3 | | | |
| Sodium dicarbadodecahydroundecaborate | | 0.5 | | | | | | |
| Ammonium 1-bromomethyl dicarbadodecahydroundecaborate | | | | 1.5 | | | | |
| Cesium 1,2-dimethyl dicarbadodecahydroundecaborate | | | | | | 0.2 | | |
| Isopropylammonium 1-phenyl dicarbadodecahydroundecaborate | | | | | | | 2.5 | |
| Lithium 1,2-diphenyl dicarbadodecahydroundecaborate | | | 0.7 | | | | 3.0 | |
| Potassium hexachloro dicarbadodecahydroundecaborate | | | | | | | | 1.8 |
| Dicarbadodecahydroundecaboric acid | | | | | | | | 0.1 |
| Carrier: | | | | | | | | |
| Wood flour | 99 | | | | | | | |
| Pumice | | 99.5 | | | | | | |
| Soybean flour | | | 97.5 | | | | | |
| Kaolin | | | | 99.0 | | | | |
| Powdered lime stone | | | | | | 96.0 | | 99.4 |
| Diatomaceous earth | | | | | | | 97.0 | |
| Expanded mica | | | | | | 95.0 | | |
| Adjuvant: | | | | | | | | |
| Sodium dodecylbenzene sulfonate | | | | 1.0 | | | 3.2 | |
| Decylphenoxypoly(ethylene oxide)ethanol | | | | | 1.5 | | | |
| Powdered blood albumin | | | | | 0.5 | | | 0.5 |
| Total | 100 | 100 | 100 | 100 | 100 | 100 | 100 | 100 |

EXAMPLE 10

The following will illustrate pesticidal compositions containing the dicarbadodecahydroundecaborate as the active component thereof which are liquid and suitable for spraying onto the treatment area:

The preceding data evidence a selective pre-emergence activity of the pesticidal compositions in that the greatest degree of herbicidal activity was exhibited against plant pests, i.e., Seteria and pigweed. Substantially the same results are obtained when equal quantities of the

| Components | Compositions (weight percent) | | | | | | | |
|---|---|---|---|---|---|---|---|---|
| | 9 | 10 | 11 | 12 | 13 | 14 | 15 | 16 |
| Active component: | | | | | | | | |
| Tributylammonium 1-cyclohexyl dicarbadodecahydroundecaborate | 3.0 | | | | | | | |
| Potassium 4-methyl dicarbadodecahydroundecaborate | | 1.5 | | | | | | |
| Sodium 4-methyl-7-phenyl dicarbadodecahydroundecaborate | | | 5.0 | | | | | |
| Triethylammonium1-ethyl-7-amyl dicarbadodecahydroundecaborate | | | | 0.5 | | | | |
| Potassium 7-allyl dicarbadodecahydroundecaborate | | | | | 2.5 | | | |
| Ammonium dibromo dicarbadodecahydroundecaborate | | | | | | 0.3 | | |
| Triamylammonium tetraiodo dicarbadodecahydroundecaborate | | | | | | | 2.3 | |
| Dicarbadodecahydroundecaboric acid | | | | | | | | 2.7 |
| Carrier: | | | | | | | | |
| Water | 92.0 | 83.0 | 95.0 | 99.5 | 73.0 | 82.0 | 96.0 | 95.0 |
| Summer spray oil [1] | | 10.0 | | | | | | |
| Benzene | | | | | 24.5 | | | |
| Weed oil [2] | | | | | | 15.2 | | |
| Adjuvant: | | | | | | | | |
| Span | 2.0 | | | | | | | |
| Tween | | 5.5 | | | | | | 2.3 |
| Triton TX-45 | | | | | | 1.0 | | |
| Tergitol 4 | | | | | | | 2.0 | |
| Synthetics D-37 | | | | | | | 1.7 | |
| Total | 100 | 100 | 100 | 100 | 100 | 100 | 100 | 100 |

[1] A paraffinic petroleum distillate, boiling range 350° to 470°F. with 92 percent unsulfonated residue.
[2] An aromatic distillate, boiling range 325° to 525°F. obtained from refractory cracked cycle stocks.

EXAMPLE 11

The pesticidal compositions according to this invention were employed for pre-emergence herbicidal activity on seven different crops. The crops employed were pigweed, tomato, morning glory, Johnson grass, oats, Seteria and cotton, which were planted in flats 11 x 13 inches in area. The toxologically active material was prepared as an aqueous acetone suspension and applied at a sufficient dosage to achieve the equivalent of 10 pounds per acre. The crops were planted in the soil and the suspension was uniformly distributed over each flat and the flats were immediately transferred to a greenhouse and covered for a period of 3 days. At the end of 14–16 days, the phytotoxicity reading was made and rated on a scale of 0 to 10 in which 0 indicates no injury and 10 indicates entire destruction of the crop. The following results were obtained:

dicarbadodecahydroundecaboric acids are substituted for the salts used in the preceding example.

EXAMPLE 12

The pesticide compositions were tested for post-emergence activity on a series of crops including pigweed, Seteria, morning glory, tomatoes, Johnson grass, oats, wheat, cucumbers, red kidney beans and cotton. The cotton tested was in the 4–6 leaf stage at the time of the spray application and the red kidney beans had a well expanded set of first two leaves. The tomatoes and cucumbers were two weeks of age the time of application. The chemicals under investigation were prepared as 50 percent wettable powders and extended in water to obtain a spray suspension. The spray was applied to the crops at the equivalent of 5 pounds per acre active ingredient and the plants were rated for phytotoxicity at 10

| Pesticide | Variable | Seteria | Pigweed | J. grass | M. glory | Tomato | Oats | Cotton |
|---|---|---|---|---|---|---|---|---|
| Potassium neo dicarbadodecahydroundecaborate | Percent germ. P.R.[1] | 40 | 20 | 70 | 20 | 70 | 80 | 85 |
| | | 8 | 7 | 3 | 8 | 0 | 0 | 0 |
| Tetramethylammonium ortho dicarbadodecahydroundecaborate | do | 20 | 40 | 40 | 60 | 70 | 80 | 80 |
| | | 8 | 6 | 3 | 2 | 1 | 0 | 0 |
| Tetramethylammonium 1-phenyldicarbadodecahydroundecaborate | do | 60 | 50 | 70 | 75 | 80 | 75 | 80 |
| | | 2 | 4 | 0 | 0 | 0 | 0 | 0 |
| Karmex | do | 10 | 10 | 10 | 10 | 10 | 40 | 80 |
| | | 10 | 10 | 10 | 10 | 10 | 4 | 2 |
| Check | do | 75 | 70 | 70 | 80 | 85 | 85 | 85 |
| | | 0 | 0 | 0 | 0 | 0 | 0 | 0 |

[1] Phytotoxicity rating on scale of 0 to 10 where 0 is no phytotoxicity and 10 is total plant necrosis.

to 12 days after application using a rating from 0 to 10 in which the 0 indicated no injury and 10 indicated complete necrosis of the plant. The following table summarizes the results:

| Pesticide | Pounds per acre | Pigweed | Seteria | J. grass | M. glory | Tomato | Oats | Wheat | Cuks | R.K.B. | Cotton |
|---|---|---|---|---|---|---|---|---|---|---|---|
| Potassium neo dicarbadodecahydroundecaborate | 5 | 5 | 3 | 3 | 10 | 7 | 2 | 2 | 8 | 6 | 1 6 |
| Trimethyl ammonium ortho dicarbadodecahydroundecaborate | 5 | 3 | 2 | 4 | 8 | 6 | 1 | 1 | 7 | 5 | 2 4 |
| Trimethylammonium 1-phenyl dicarbadodecahydroundecaborate | 5 | 3 | 2 | 2 | 6 | 7 | 1 | 1 | 5 | 4 | 3 4 |
| Karmex | 2 | 9 | 10 | 7 | 10 | 9 | 6 | 6 | 10 | 10 | 1 |
| Check | | 0 | 0 | 0 | 0 | 0 | 0 | 0 | 0 | 0 | 0 |

[1] 60% defoliation.   [2] 30% defoliation.   [3] 20% defoliation.

The chemicals under investigation exhibited greater phytotoxicity to the broadleafed weeds or crops such as pigweed, morning glory, tomatoes, cucumbers, red kidney beans and cotton, than to the grass family. The chemicals further demonstrated defoliation of the cotton showing a range from 20 to 60 percent defoliation in the testing. Substantially the same results are obtained when an equivalent amount of the di-, tetra- and hexa-β-halo substituted dicarbadodecahydroundecaborates are substituted for the dicarbadodecahydroundecaborates of the previous example.

EXAMPLE 13

The chemicals under investigation were evaluated for fungicidal activity against Sclerotium in a test procedure wherein soil sterilized by methyl bromide was admixed with 20 weight percent cornmeal and then admixed with 10 weight percent of the test organism, Sclerotium and placed in 50 gram quantities in 4 replicated paper cups. The soil was then treated with the candidate chemical by drenching each cup separately with 10 milliliters of the pesticide chemical prepared as a 50 percent wettable powder. A concentration of the wettable powder in the aqueous emulsion is adjusted so that the 10 milliliter quantity yielded a dosage of 100 parts per million based on the weight of the soil. The cups were placed in a constant temperature humidity cabinet maintained at 60°–65° F. for four days and then rated for mycelial growth on the fourth day on a rating of 0 to 5 with 0 representing no control and 5 representing no mycelial growth. The following data evidencing fungicidal activity for all test materials were obtained:

Pesticide:                                                  Mycelial growth
    Potassium neo dicarbadodecahydroundecaborate ------------------------------- 4
    Trimethylammonium ortho dicarbadodecahydroundecaborate ----------------------- 2
    Trimethylammonium 1-phenyldicarbadodecahydroundecaborate ----------------------- 3
    Lanstan ------------------------------------- 4
    Check -------------------------------------- 0
    Sterile soil ---------------------------- 5

The aforementioned chemicals were also tested on a varied dosage experiment in soil in replicate experiments. The chemicals under investigation were varied from 100 to 12.5 parts per million and the following data were obtained:

| Pesticide | Dose, p.p.m. | Sclerotium-cucumbers mycelial growth |
|---|---|---|
| Potassium neo-dicarbadodecahydroundecaborate | 100 | 4 |
| | 50 | 2 |
| | 25 | 1 |
| | 12.5 | 0 |
| Trimethylammonium 1-phenyl dicarbadodecahydroundecaborate | 100 | 3 |
| | 50 | 2 |
| | 25 | 1 |
| | 12.5 | 0 |
| Lanstan | 100 | 4 |
| | 50 | 3 |
| | 25 | 1 |
| | 12.5 | 0 |
| Sterile soil | | 5 |
| Check | | 0 |

EXAMPLE 14

The bactericidal activity of the trimethylammonium ortho dicarbadodecahydroundecaborate was evaluated by applying a wettable powder containing the chemical to a sterile paper disc 0.7 centimeter in diameter which was dipped into the chemical and placed on the inoculated nutrient agar. The agar was maintained in a Bakelite capped bacteriological test tube containing 15 milliliters of the nutrient broth to which was transferred one loop of a 24-hour old culture of Staphylococcus aureus and Salmonella typhosa. The nutrient agar was poured immediately into 9.6 centimeter sterile plastic Petri plates and gently swirled to distribute the bacteria uniformly throughout the media. The agar was permitted to set from 1 to 2 hours before treatment with the chemicals which were applied at a dosage of 1000 parts per million. Readings were made on the width of the clear zone or zone of inhibition extending from the periphery of the sterile discs to the edge of the clear zone in the Petri plate and it was observed to be 6.5 millimeters in width for the gram positive Staphylococcus aureus. Treatment with a similar concentration of Thimersol resulted in a zone of inhibition of 16 millimeters, whereas an acetone treated area and the check exhibited no zones of inhibition. Activity against the gram negative bacteria was not observed for the chemical under investigation.

EXAMPLE 15

The pesticidal composition of the preceding example was evaluated for activity against the larvae of the Southern Army worm. The test was conducted by preparing the pesticide as a 50 percent wettable powder diluted to 500 parts per million in water. The third to fourth instar larvae of the Southern Army worm were momentarily immersed in the chemical suspension. Small excised portions of corn leaves previously dipped and dried are placed in Petri plates along with the treated larvae and held there during the period of observation over a 48 hour period. The treatment was performed in duplicate with 5 larvae per replicate and the application was made at effective dosages of 500, 250 and 125 parts per million of the chemical under investigation. The following data evidencing activity were obtained:

| Pesticide | Dose, p.p.m. | 48 hours, percent kill | Percent feeding |
|---|---|---|---|
| Trimethylammonium ortho dicarbadodecahydroundecaborate | 500 | 90 | 25 |
| | 250 | 40 | 40 |
| | 125 | 0 | 70 |
| DDT | 100 | 100 | 0 |
| Check | | 0 | 95 |

EXAMPLE 16

The pesticidal compositions of the potassium neo dicarbadodecahydroundecaborate and the trimethylammonium ortho dicarbadodecahydroundecaborate were evaluated for insecticidal activity against houseflies in which 3-day-old female houseflies were anesthetized by exposure to a slow flow of carbon dioxide and then the pesticide chemical was applied as micro droplets to the metathorax region with a calibrated micro injection needle. The flies after treatment were held in quart jars with a wire screen top on the surface of which was placed a cotton wad containing a sugar solution. The flies were observed and the percent mortality recorded after a 48-hour period. The following data were obtained:

| Pesticide | Dose, gamma | 48 hours, percent kill |
|---|---|---|
| Potassium neo dicarbadodecahydroundecaborate | 10 | 100 |
| | 1 | 60 |
| | 0.1 | 30 |
| Trimethylammonium ortho dicarbadodecahydroundecaborate | 10 | 100 |
| | 1 | 60 |
| | 0.1 | 40 |
| Malathion | 1 | 100 |
| | 0.1 | 20 |
| Check | | 0 |

The preceding illustrations are set forth solely to illustrate a mode of practice of the invention and are not intended to be construed as unduly limiting thereof. Instead it is intended that the invention be defined by the reagents and obvious equivalents set forth in the following composition claims and by the steps and their obvious equivalents set forth in the following method claims.

I claim:

1. A method for controlling pests that comprises contacting said pests with an effective amount of a pesticidal composition comprising an inert pesticidal carrier material and, as the essential active ingredient, dicarbadodecahydroundecarboric acid and its alkali metal and ammonium salts thereof having the following formula:

$$M[(BX)_m(BR_1)_nCR_2CR_3]$$

wherein:

M is hydrogen, alkali metal, ammonium or $C_1$–$C_5$ alkylammonium;

X is hydride or halide;

$R_1$ has 1 to 10 carbons and is alkyl, aryl, alkenyl or halo or carboxy derivatives thereof;

$R_2$ and $R_3$ are hydride, halide, cyclohexyl or alkyl, aryl, alkenyl, or carboxyl having from 1 to about 10 carbons;

n is 0, 1 or 2; and $m+n=9$;

in an amount effective to cause necrosis of said pests.

2. The method of claim 1 wherein said active ingredient is (3)1,2-dicarbadodecahydroundecaboric acid and its alkali metal and ammonium salts.

3. The method of claim 1 wherein said pests are plant pests.

4. The method of claim 1 wherein at least one of said $R_2$ and $R_3$ is phenyl.

5. The method of claim 3 wherein said pests are broad-leafed plant pests.

6. The method of claim 1 as applied to the pre-emergence control of plant pests which comprises applying said pesticidal composition to the soil before emergence of said plant pests.

7. The method of claim 1 wherein said pesticidal composition contains a surfactant.

8. The method of claim 1 wherein said pesticidal carrier material is a powdered, inert solid.

9. The method of claim 1 wherein M is potassium.

10. The method of claim 1 wherein M is a $C_1$–$C_5$ alkyl ammonium.

References Cited

Young, Studies in Carbarane Chemistry, Abstract Order No. 67–5867, 1966.

JAMES O. THOMAS, JR., Primary Examiner

U.S. Cl. X.R.

424—185